Sept. 13, 1966  E. A. ERICSON  3,273,103
POLARIZING MEANS FOR BUSWAY PLUG
Filed April 27, 1964  3 Sheets-Sheet 1
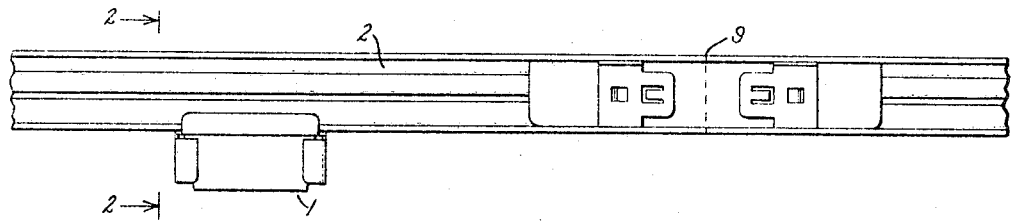
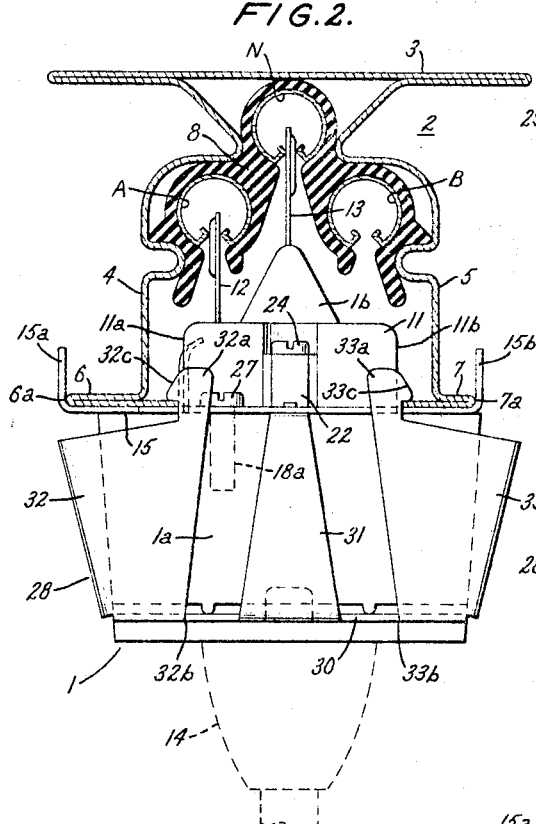
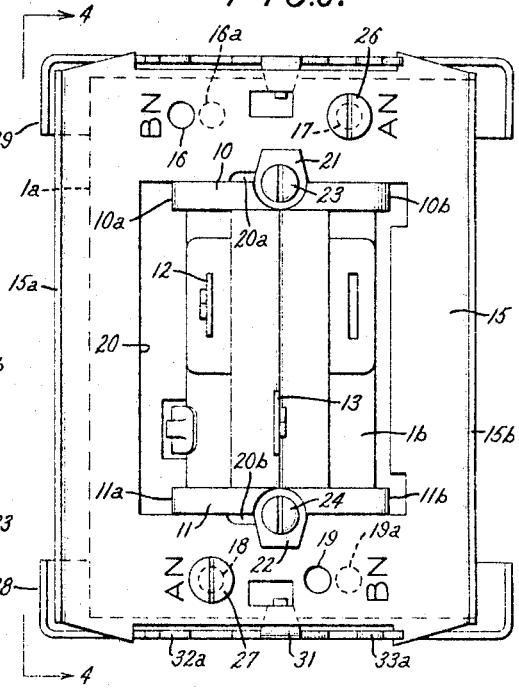
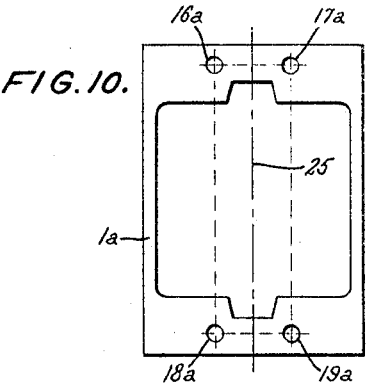
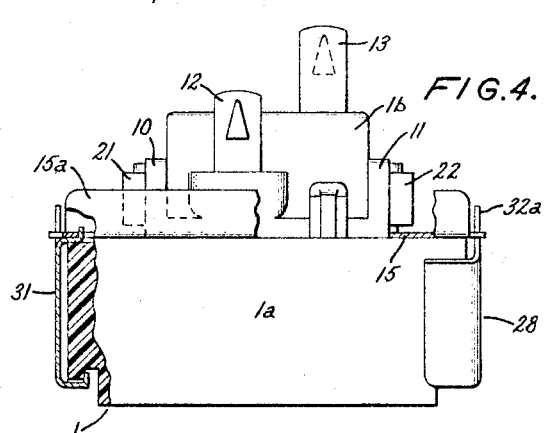
INVENTOR:
ERIC A. ERICSON,
BY Irving H. Marshman
ATTORNEY

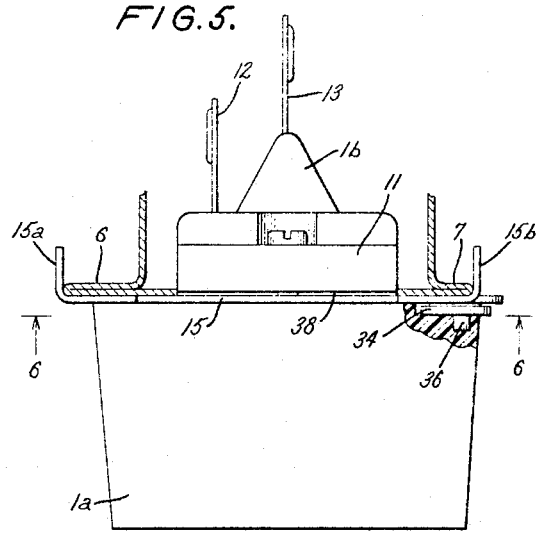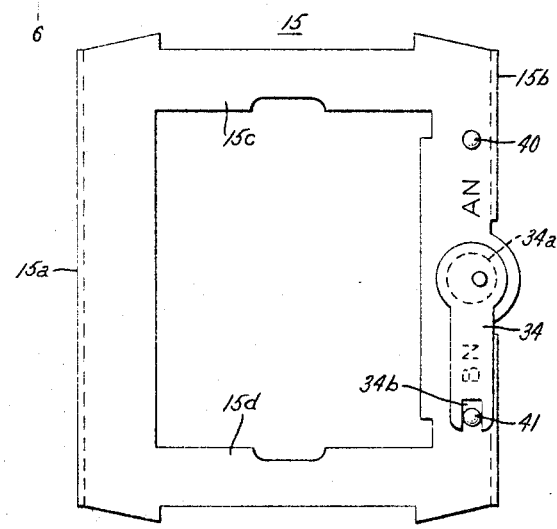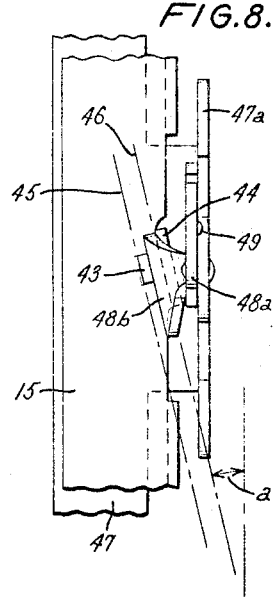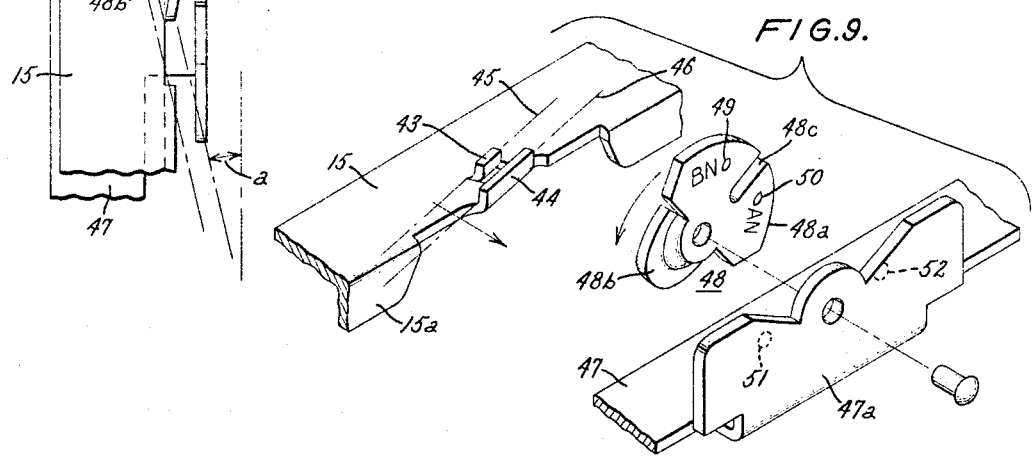

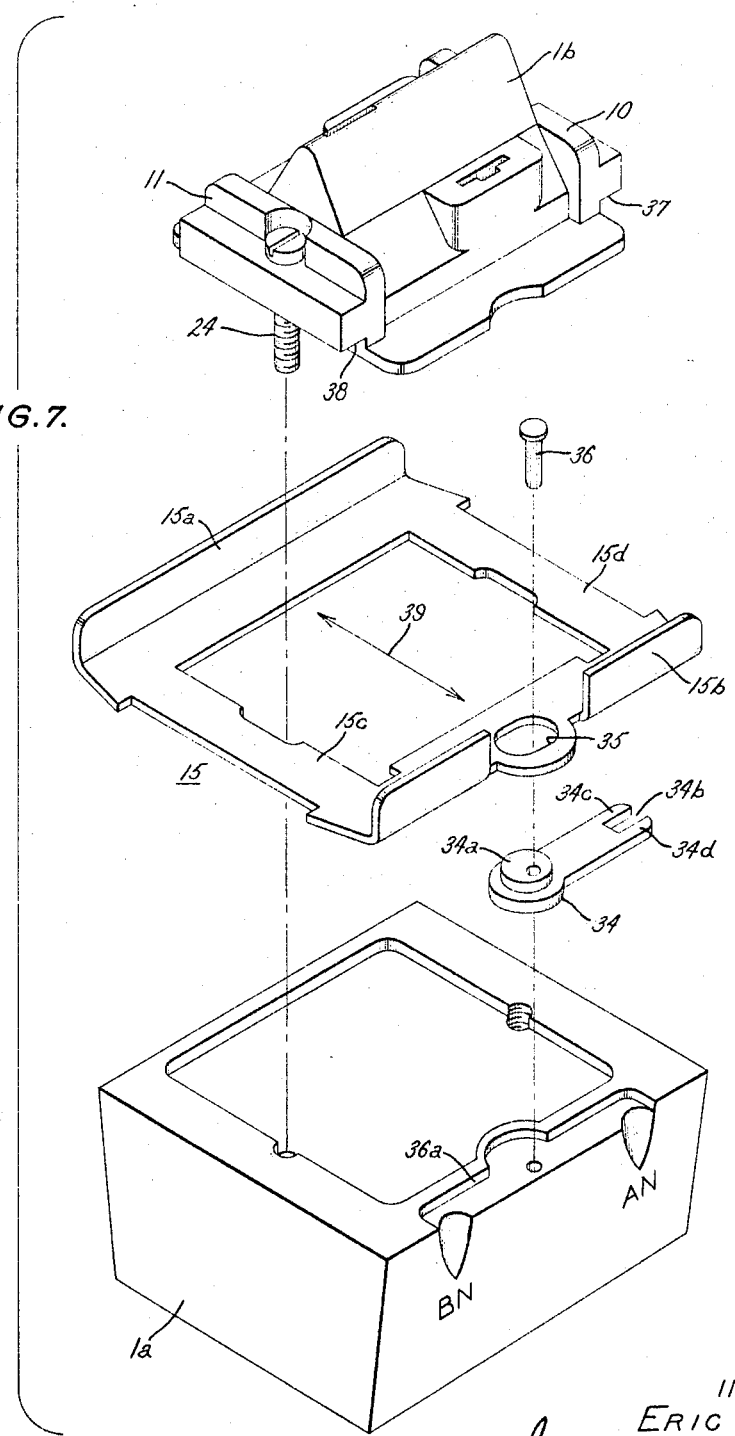

United States Patent Office 3,273,103
Patented Sept. 13, 1966

---

3,273,103
POLARIZING MEANS FOR BUSWAY PLUG
Eric A. Ericson, Plainville, Conn., assignor to General Electric Company, a corporation of New York
Filed Apr. 27, 1964, Ser. No. 362,693
8 Claims. (Cl. 339—22)

This invention relates to power distribution systems; more particularly to power takeoff devices for polarized busways and it has for an object the provision of a simple, reliable and inexpensive power takeoff device of this character.

Another object of the invention is the provision of a simple and inexpensive polarizing means for a plug type power takeoff device.

Still another object of the invention is the provision of a plug polarizing device that may be easily adjusted to change the polarization of the plug.

The invention is applicable to plugs that are constructed for attachment to a busway comprising a housing having longitudinally extending base flanges spaced apart to provide an open slot therebetween and a plurality of longitudinally extending spaced apart busbars therein that are accessible through the slot. Corresponding longitudinal edges of the two flanges are unequally distant from the longitudinal central plane of the housing.

In carrying the invention into effect in one form thereof, a plug is formed of a body of insulating material having a base portion and a cap portion in which a pair of stab contacts are mounted for engagement with a preselected pair of the busbars within the busway housing. A polarizing plate having upturned opposite lateral flanges is disposed on the base with its flanges in position for engaging the outside longitudinal edges of the flanges of the housing and means are provided for selectively securing the polarizing plate in either of two positions to provide either of two polarizations of the plug with respect to the busway. Indicating means are provided in cooperative relationship with the plate securing means for providing an indication of the polarization of the plug.

For a better and more complete understanding of the invention, reference should now be had to the following specification and to the accompanying drawings of which:

FIG. 1 is a side view of a busway and a power takeoff device embodying the invention, FIG. 2 is a sectional view on an enlarged scale taken on the line 2—2 of FIG. 1, FIG. 3 is a plan view of a plug and polarizing plate embodying the invention, FIG. 4 is a side view on a reduced scale of the plug and polarizing means of FIG. 3 with parts broken away and looking in the direction of the arrows on the line 4—4 of FIG. 3, FIG. 5 is an end view of a modification of the invention, FIG. 6 is a bottom plan view of the modification of FIG. 5 taken on the line 6—6 and looking in the direction of the arrows, FIG. 7 is an exploded view in perspective of the polarizing plate of FIGS. 5 and 6 showing lever means for moving and securing the polarizing plate in alternate polarizing positions.

FIG. 8 is a fragmentary plan view of a polarizing plate with modified camming means, FIG. 9 is an exploded view in perspective of the modification of FIG. 8, and FIG. 10 is a plan view of the base of the plug of FIG. 3 with the polarizing plate removed to reveal the attachment holes in the base.

Referring now to the drawings and particularly to FIGS. 1, 2, 3 and 4 thereof, a power takeoff device 1 is plugged in to a power distribution busway 2. The busway 2 may be of any suitable type. It is illustrated as comprising a housing formed of sheet metal, e.g., roll formed sheet steel. The housing has a top wall 3, side walls 4 and 5 and base flanges 6 and 7. As shown in FIG. 2 these flanges are of unequal width. The flange 6 is wider than the flange 7. Owing to this dissymmetry the distances from the longitudinally extending lateral edges 6a and 7a of these flanges to the central longitudinal plane of the busway are unequal.

Within the housing are a plurality of busbars A, B, and N. These busbars are encapsulated in corresponding longitudinally extending hollow cavities of a flexible insulating member 8. This insulating member is preferably made of a suitable material such as polyvinyl chloride. In the construction illustrated in FIG. 2 the insulating member has a trilobate cross section with a cavity in each lobe. Each of these cavities has a longitudinally extending slot opening that faces the plane of the bottom flanges 6 and 7. The housing is preferably fabricated in sections that are joined together at a section joint. For example, in FIG. 1 two sections of the housing are illustrated as being joined together at the sectional joint line 9. The insulating member is coextensive with its housing section, i.e., it extends continuously from end to end thereof.

The bus bars A, B and N are illustrated as being hollow tubular members having inturned edges spaced apart to provide longitudinally extending slots each in register with the slot in the insulation lobe in which it is encapsulated. The slots in the insulation and the busbar slots in register therewith constitute stab-in openings for admitting the stab contacts of a plug type power takeoff device such as the plug 1. Although the busbars A, B and N are illustrated as having generally round tubular cross sections this is not essential; they may have any suitable cross section. They are made of any good electrical conducting material such as copper or aluminum.

The plug 1 is preferably a body of molded insulating material. It has a base portion 1a and a cap portion 1b. At the opposite ends of the cap 1b are two projections 10 and 11 of generally oblong configuration with rounded upper corners. The base has the general configuration of a rectangular block and the cap has the configuration of a block of triangular cross sections. The cap is shorter and narrower than the base. Mounted in appropriate apertures in the cap are a pair of stab contacts 12 and 13. These stab contacts are positioned in the cap so that when the plug 1 is plugged into the busway the stab contact 13 is stabbed through the central stab opening in the central lobe of the insulation number 8 and into engagement with the contact surfaces of busbar N, and the stab contact 12 is stabbed into engagement with one or the other of busbars A and B. In FIG. 2, the stab contact 12 is illustrated in contact engagement with busbar A. The bottom of the base 1a is provided with a receptacle outlet having plug-in openings through which tthe blades of a standard attachment plug 14 may be inserted into contact engagement with terminal contact portions of the stab contacts within the base 1a.

Suitable means are provided for polarizing the plug 1 so that its stab contacts may be stabbed into a selected one or the other of the circuits provided by bus bars A and N or bus bars B and N and thereafter may not be inadvertently stabbed into the other circuit. This polarizing means comprises a polarizing plate 15, four attachment holes 16, 17, 18 and 19 therein and four corresponding and cooperating attachment holes 16a, 17a, 18a and 19a in the base.

The polarizing plate 15 has a generally oblong configuration and is provided with two longitudinally extending lateral flanges 15a and 15b which are bent up at right angles to general plane of the plate. As shown in FIG. 2 the distance between these flanges is approximately equal to the distance between the outside edges 6a and 7a of the base flanges of the busway housing. The central portion of the plate is cut out to form an opening 20 of which the length is slightly longer than the distance between the outside faces of the projections 10 and 11 of the cap. The width of the opening 20 exceeds the width of the triangular portion of the cap at the plane of the base by an amount sufficient to provide substantial lateral margins to permit the plate to occupy two different polarizing positions on the base. As shown in FIGS. 2 and 3 two bosses 21 and 22 project from the ends of the cap and overlie the top surface of the plate 15 at the end edges of opening 20. These end edges have recesses 20a and 20b to provide clearance with respect to the screws 23 and 24 by means of which the cap is fastened to the base. As a result of this clearance, the polarizing plate can be slid in a transverse direction from one to the other of its polarizing positions.

As shown in FIG. 10 the attachment holes 16a, 17a, 18a and 19a in the base 1a of the plug 1 are arranged in rectangular configuration, i.e., their center lines constitute the corners of a rectangle. Consequently, the distance between the holes 16a and 17a is equal to the distance between the holes 18a and 19a and the arrangement of these holes is symmetrical with respect to the longitudinal center line 25 of the base. In contrast, the holes 16, 17, 18 and 19 in the polarizing plate are unsymmetrically arranged with respect to the longitudinal center line of the plate, i.e., the distance between the holes 16 and 17 at one end is greater than the distance between the holes 18 and 19 at the other end. The distance between holes 16 and 17 in the polarizing plate is greater by a predetermined amount than the distance between the corresponding holes 16a and 17a in the base. Also the distance between holes 18 and 19 in the polarizing plate is less than the distance between the corresponding holes 18a and 19a in the base by the same predetermined amount.

For the purpose of securing the polarizing plate to the base in either of its polarizing positions, a pair of pan head fastening screws 26 and 27 are provided. In FIG. 2 the stab contacts 12 and 13 are illustrated as stabbed into contact engagement with the busbars A and N respectively. To polarize the plug for this A, N connection, the fastening screws 26 and 27 are passed through the diagonally opposite holes 17 and 18 respectively in the polarizing plate and are driven into the corresponding diagonally opposite holes 17a and 18a respectively in the base as illustrated in FIG. 3. With the plate in this polarizing position, the distance between the flange 15a of the plate and the surface 10a and 11a of the projections 10 and 11 of the cap are slightly greater than the width of the base flange 6 of the busway. Similarly, the distances between the flange 15b of the plate and the opposite end surfaces 10b and 11b of the projections 10 and 11 are slightly greater than the width of the base flange 7. Consequently the plug may be plugged into the busway in the AN polarization illustrated in FIG. 2. It cannot be plugged into the busway for contact engagement of the stab contacts 12 and 13 with the busbars B and N. This is prevented because the width of the base flange 6 of the busway housing is greater than the distance between the upturned flange 15b of the polarizing plate and the end faces 10b and 11b of the projections 10 and 11 of the cap. Thus, inadvertent misconnection of the plug to the busway is precluded. The AN polarization of the plug is indicated by the positional proximity of the heads of the fastening screws 17 and 18 with the AN indicia on the polarizing plate 15.

To provide for power takeoff from the B and N busbars the polarizing plate must be secured to the base of the plug in the BN polarizing position. This is accomplished by removing the screws 26 and 27 and sliding the polarizing plate to the right to bring the diagonally opposite attachment holes 16 and 19 in the plate into register with the corresponding holes 16a and 19a in the base of the plug. The plate is then secured in the BN polarizing position by passing the screws 26 and 27 through holes 16 and 19 respectively and driving them into holes 16a and 19a in the base. In the new position of the polarizing plate, the distances between the upturned flange 15b and the end faces 10b and 11b of projections 10 and 11 are slightly greater than the width of the base flange 6 of the busway housing. Similarly, the distances between upturned flange 15a and the end faces 10a and 11a are slightly greater than the width of the base flange 7. Consequently by reversing the orientation of the plug, i.e., turning it end for end from the position illustrated in FIG. 3 is can be plugged into the busway in BN polarization, i.e., with its stab contacts 12 and 13 in contact engagement with busbars B and N respectively. It cannot thereafter be inadvertently plugged into the busway with its stab contacts 12 and 13 in contact engagement with busbars A and N respectively. The BN polarization of the plug is indicated by the positional proximity of the heads of the fastening screws 17 and 18 to the BN indicia on the polarizing plate.

For the purpose of clamping the plug to the busway, the plug is provided at its opposite ends with identical spring clamps 28 and 29. As shown in FIG. 2, clamp 28 comprises a base member 30, a stationary central arm 31 and two lateral arms 32 and 33 attached to the base. At their upper ends, the lateral arms 32 and 33 are provided with hooks 32a and 33a respectively. The base 30 of the clamp is sufficiently flexible to permit the lateral arms to be rotated toward each other about the points 32b and 33b of their attachment to the base 30. Thus by manually squeezing the arms 32 and 33 toward each other, the hooks 32a and 33a can be withdrawn from hook engagement with the base flanges 6 and 7. The hooks are provided with inclined surfaces 32c and 33c which engage the inside edges of busway flanges 6 and 7 during the plug-in operation. When the plug is stabbed into the busway the hooks snap over the inside edges of the base flanges to the positions illustrated in FIG. 2 and thus securely hold the plug in its fully stabbed in position on the busway.

The polarizing plate 15 may be made of any suitable material. For example, it may be made of ¼ hard cold rolled low carbon steel having a thickness of approximately .04 inch. Annealed .65 to .8 carbon spring steel having a thickness of .02 inch may be used for the clamps 28 and 29.

In the modification illustrated in FIGS. 5, 6 and 7, the molded base 1a, the molded cap 1b and the polarizing plate 15 are generally similar to the parts designated by the same reference characters in the modification illustrated in FIGS. 1–4 inclusive. The principal difference of the two modifications resides in the means for securing the polarizing plate 15 in either of its two polarizing positions. These means comprise a polarizing lever 34 and a cooperating slot 35 in the polarizing plate 15 near one edge thereof. The lever 34 is pivotally mounted on the base by suitable means such as drive rivet 36 and is provided with a circular raised portion 34a that is eccentric with respect to the pivotal axis. A recess 36 is provided for the polarizing lever in the base 1a. This recess is shaped to permit 180 degrees rotation of the lever in either direction about its pivot and to house the lever in either of its 180 degree positions.

In the assembled state of the plug, the polarizing plate is captured between the molded base 1a and the molded cap 1b. Grooves 37 and 38 are provided in the overhanging portions of the projections 10 and 11 of the cap. These serve as guides for the arms 15c and 15d of the polarizing plate. The raised eccentric portion 34a of the lever projects into the slot 35 of the polarizing plate. In response to the rotation of the lever in either direction, the eccentric raised portion produces a camming action which effects a sliding movement of the polarizing plate in a corresponding direction as indicated by arrow 39.

For the purpose of locking the polarizing lever in either of its 180 degree positions, the bottom surface of the polarized plate is provided with protuberant detents 40 and 41 and the polarizing lever is provided with a cooperating slot 34b that is formed between two arms 34c and 34d. As the lever is forced into one or the other of its 180° positions, a corresponding one of the arms is snapped over the detent and the lever 34 comes to rest with the arms straddling the detent as illustrated in FIG. 6.

When the lever is in the position illustrated in FIG. 6, the polarizing plate 15 is secured in the AN polarizing position and the plug may be inserted in the busway with its contacts 12 and 13 in engagement with the A and N busbars respectively. This AN polarization is indicated by the letters AN on the bottom surface of the polarizing plate which are uncovered when the lever and the polarizing plate are in the AN polarizing position. When the lever is in its other 180° position, the polarizing plate is secured in the BN polarizing position and the plug may be inserted in the busway with its contacts engaging the B and N busbars. This polarization is indicated by the letters BN on the bottom surface of the polarizing plate which are uncovered when the lever and the polarizing plate are in the BN polarizing position. The polarizing markings AN and BN may also be applied to the base member 1a in appropriate locations such that the positional correspondence of the end of the lever and either of the markings indicates the busbars to which the stab contacts will be connected when the plug is inserted in the busway.

The modification illustrated in the fragmentary views of FIGS. 8 and 9 is generally similar to the modification of FIGS. 5, 6 and 7. It differs therefrom primarily in that the polarizing lever acts in a plane at right angles to the plane of motion of the polarizing plate 15. As shown in FIGS. 8 and 9 the bottom surface of the polarizing plate is provided with two lugs 43 and 44 bent up at right angles to the plane of the plate along bend lines 45 and 46 at an angle $a$ to the longitudinal axis of the polarizing plate. A mounting plate 47 is secured to the base of the plug by any suitable means (not shown). This mounting plate is provided with an arm 47a which is bent up at right angles to the plane of the plate. Pivotally mounted on the arm 47a for rotation with respect thereto is a member 48 that moves the polarizing plate 15 and also secures it in either of its polarizing positions. It comprises semicircular portions 48a and 48b. The semicircular portion 48b is bent away from the semicircular portion 48a so that its rim occupies a plane that is disposed at an angle with respect to the plane of the semicircular member 48a that is equal to the angle $a$ between the bend lines 45 and 46 and the longitudinal axis of the polarizing plate. A radial slot 48c of sufficient size to receive the blade of a small screwdriver is provided in the semicircular portion 48a. It is located on a radius that divides the semicircular portion 48a into two quarter sections. These sections are provided with protuberant detents 49 and 50 which cooperate with dimples 51 and 52 respectively on the innerface of arm 47 to lock the cam member 48 in either of its limiting positions. Polarization indicia such as AN and BN are provided on the section as shown in FIG. 9.

When the detent 50 is in engagement with dimple 52, the polarizing plate 15 is in the BN polarizing position and the indicia BN on the member 48 are uncovered to indicate this polarization. To move the polarizing plate to the AN polarizing position, the blade of a screwdriver or other suitable device is inserted in slot 48c and the member 48 is rotated in the direction of the arrow to move the plate 15 toward the arm 47a. At the end of a predetermined amount of rotation, the polarizing plate reaches its AN polarizing position and is secured therein by engagement of detent 49 in dimple 51.

In this polarizing position the indicia AN appear above the central portion of the arm 47a and indicate the AN polarization of the plug.

Although particular embodiments of the invention have been shown and described it will be apparent to persons skilled in the art that alterations and modifications may be made without departing from the invention and therefore it is aimed in the appended claims to cover all such alterations and modifications as fall within the true spirit and scope of the invention.

What I claim as new and desire to secure by Letters Patent of the United States is:

1. A branch plug-in device for attachment to a busway comprising a housing having longitudinally extending base flanges spaced apart to provide an open slot therebetween and having spaced apart longitudinally extending busbars within said housing accessible through said slot, one of the longitudinal edges of one of said flanges and the corresponding longitudinal edge of the other of said flanges being unequally distant from the longitudinal central plane of said housing, said plug-in device comprising:
    (a) an insulating body provided with a pair of stab contacts for engagement with a preselected pair of said bus bars and having a base for mounting said contacts,
    (b) a polarizing plate having upturned opposite lateral flanges disposed on said base with its lateral flanges in position for engaging the outside longitudinal edges of said base flanges of said housing,
    (c) means for selectively securing said polarizing plate in either a first or a second position on said base, and
    (d) indicating means in cooperative relationship with said securing means for providing an indication of the position in which said polarizing plate is secured.

2. A branch plug-in device for attachment to a busway comprising a housing having longitudinally extending base flanges spaced apart to provide an open slot therebetween and having spaced apart longitudinally extending busbars within said housing accessible through said slot, one of the longitudinal edges of one of said flanges and the corresponding longitudinal edge of the other of said flanges being unequally distant from the longitudinal central plane of said housing, said plug-in device comprising:
    (a) an insulating body provided with a pair of stab contacts for engagement with a preselected pair of said bus bars and having a base for mounting said contacts,
    (b) a polarizing plate having upturned opposite lateral flanges disposed on said base with its lateral flanges in position for engaging the outside longitudinal edges of said base flanges of said housing,
    (c) said base being adapted for mounting said polarizing plate in first and second positions thereon to provide corresponding polarizing relationships of said stab contacts and said bus bars in which said stab contacts may engage first or second selected pairs of said bus bars,
    (d) means for selectively securing said polarizing plate in said first or said second position, and
    (e) indicating means arranged in cooperative relationship with said securing means to provide an indication of the pair of bus bars that may be engaged by said stab contacts.

3. A branch plug-in device for attachment to a busway comprising a housing having longitudinally extending base flanges spaced apart to provide an open slot therebetween and having spaced apart longitudinally extending bus-bars within said housing accessible through said slot, one of the longitudinal edges of one of said flanges and the corresponding longitudinal edge of the other of said flanges being unequally distant from the longitudinal central plane of said housing, said plug-in device comprising:
    (a) an insulating body provided with a pair of stab contacts for engagement with a preselected pair of said bus bars and having a base for mounting said contacts, (b) a polarizing plate having upturned opposite lateral flanges disposed on said base with said lateral flanges in position for engaging the outside longitudinal edges of said base flanges of said housing, (c) said base being adapted for mounting said polarizing plate in first and second positons thereon to provide corresponding polarizing relationships of said stab contacts and said bus bars in which said stab contacts may engage first or second selected pairs of said bus bars, (d) means for selectively securing said plate in said first or said second position comprising:
  (1) first and second pairs of attachment holes in said base,
  (2) corresponding first and second pairs of attachment holes in said plate cooperating with said first and second pairs respectively of attachment holes in said base,
  (3) the distance between the holes of each of said pairs in said base and the distance between the holes of each of said corresponding pairs in said plate being unequal,
  (4) a first fastening device passing through corresponding holes of cooperating first pairs of holes in said base and polarizing plate,
  (5) a second fastening device passing through corresponding holes of cooperating second pairs of holes in said base and polarizing plate, (e) and bus bar designations on said polarizing plate adjacent the holes therein and cooperating with said fastening devices to provide an indication of the bus bars that may be engaged by said stab contacts.

4. A branch plug-in device attachment to a busway comprising a housing having longitudinally extending base flanges spaced apart to provide an open slot therebetween and having spaced apart longitudinally extending busbars within said housing accessible through said slot, one of the longitudinal edges of one of said flanges and the corresponding longitudinal edge of the other of said flanges being unequally distant from the longitudinal central plane of said housing, said plug-in device comprising:

(a) an insulating body provided with a pair of stab contacts for engagement with a preselected pair of said bus bars and having a base for mounting said contacts, (b) a polarizing plate having upturned opposite lateral flanges disposed on said base with said lateral flanges in position for engaging the outside longitudinal edges of said base flanges of said housing, (c) said base being adapted for mounting said polarizing plate in first and second positions thereon to provide corresponding polarizing relationships of said stab contacts and said bus bars in the which said stab contacts may engage first or second selected pairs of said bus bars, (d) means for selectively securing said polarizing plate in said first or said second position comprising:
  (1) first and second pairs of attachment holes in said base,
  (2) corresponding first and second pairs of attachment holes in said plate cooperating with said first and second pairs respectively of attachment holes in said base, the distance between the holes of one of said pairs of holes in said plate being greater than the distance between the holes of the other of said pairs of holes in said plate.
  (3) the distance between the holes of each of said pairs in said base and the distance between the holes of each of said corresponding pairs in said plate being unequal,
  (4) a first fastening device passing through corresponding holes of said cooperating first pairs of holes in said base and polarizing plate,
  (5) a second fastening device passing through corresponding holes of said cooperating second pairs of holes in said base and mounting plate and (e) bus bar designations on said polarizing plate adjacent the holes therein and coacting with said fastening devices to provide an indication of the bus bars that may be engaged by said stab contacts.

5. A branch plug-in device for attachment to a busway comprising a housing having longitudinally extending base flanges spaced apart to provide an open slot therebetween and having spaced apart longitudinally extending bus-bars within said housing accessible through said slot, one of the longitudinal edges of one of said flanges and the corresponding longitudinal edge of the other of said flanges being unequally distant from the longitudinal central plane of said housing, said plug-in device comprising:

(a) an insulating body provided with a pair of stab contacts for engagement with a preselected pair of said bus bars and having a base for mounting said contacts, (b) a polarizing plate having upturned opposite lateral flanges disposed on said base with said lateral flanges in position for engaging the outside longitudinal edges of said base flanges of said housing, (c) said base being adapted for mounting said polarizing plate in first and second positions thereon to provide corresponding polarizing relationships of said stab contacts and said bus bars in which said stab contacts may engage first or second selected pairs of said bus bars.

(d) means for selectively securing said polarizing plate in said first or said second position comprising:
  (1) four attachment holes in said base arranged at the corners of a generally rectangular configuration,
  (2) four attachment holes in said plate arranged at the corners of a generally rectangular configuration,
  (3) the lengths of two opposite sides of one of said rectangular configurations being different from the lengths of the corresponding two opposite sides of the other of said rectangular configurations,
  (4) a first fastening device passing through a first hole in said plate and a corresponding first hole in said base,
  (5) a second fastening device passing through a second hole in said plate and a second hole in said base that are diagonally opposite from said first holes and (e) bus bar designations on said polarizing plate adjacent the holes therein and coacting with said fastening device to provide an indication of the bus bars that may be engaged by said stab contacts.

6. A branch plug-in device for attachment to a busway comprising a housing having longitudinally extending base flanges spaced apart to provide an open slot therebetween and having spaced apart longitudinally extending bus bars within said housing accessible through said slot, one of the longitudinal edges of one of said flanges and the corresponding longitudinal edge of the other of said flanges being unequally distant from the longitudinal central plane of said housing, said plug-in device comprising:

(a) an insulating body provided with a pair of stab contacts for engagement with a preselected pair of said bus bars and having a base for mounting said contacts, (b) a polarizing plate having upturned opposite lateral flanges disposed on said base with said lateral flanges in position for engaging the outside longitudinal edges of said base flanges of said housing,
(c) said base being adapted for mounting said polarizing plate in first and second positions thereon to provide corresponding polarizing relationships of said stab contacts and said bus bars in which said stab contacts may engage first or second selected pairs of said bus bars,
(d) cam means for effecting movement of said polarizing plate between said first and second positions and for securing said plate in either of said positions and
(e) bus bar designation means on said plate in predetermined positional relationship with said cam means to provide an indication of the bus bars that may be engaged by said stab contacts.

7. A branch plug-in device for attachment to a busway comprising a housing having longitudinally extending base flanges spaced apart to provide an open slot therebetween and having spaced apart longitudinally extending bus-bars within said housing accessible through said slot, one of the longitudinal edges of one of said flanges and the corresponding longitudinal edge of the other of said flanges being unequally distant from the longitudinal central plane of said housing, said plug-in device comprising:
(a) an insulating body provided with a pair of stab contacts for engagement with a preselected pair of said bus bars and having a base for mounting said contacts,
(b) a polarizing plate having upturned opposite lateral flanges disposed on said base with said lateral flanges in position for engaging the outside longitudinal edges of said base flanges of said housing,
(c) said base being adapted for mounting said polarizing plate in first and second positions thereon to provide corresponding polarizing relationships of said stab contacts and said bus bars in which said stab contacts may engage first or second selected pairs of said bus bars.
(d) means for effecting movement of said polarizing plate between said first and second positions and for securing said plate in either of said positions comprising a cam slot in said plate, a cooperating camming lever pivotally mounted on said base for rotation between first and second limiting positions corresponding to said first and second positions respectively of said plate and means for securing said lever in either of said limiting positions and
(e) bus bar designations on said polarizing plate adjacent said limiting positions and cooperating with said lever to provide an indication of the bus bars that may be engaged by said stab contacts, 8. The plug-in device of claim 7 in which the cam slot comprises two spaced apart cam following lugs on the polarizing plate and a cooperating cam plate mounted on said base for rotation in a plane perpendicular to the plane of said polarizing plate.

References Cited by the Examiner

UNITED STATES PATENTS 2,626,301  1/1953  Hammerly _____ 339—22 X

FOREIGN PATENTS 634,004  3/1950  Great Britain.

EDWARD C. ALLEN, *Primary Examiner.*

P. A. CLIFFORD, *Assistant Examiner.*